US008175916B2

(12) United States Patent
Tabuchi

(10) Patent No.: US 8,175,916 B2
(45) Date of Patent: May 8, 2012

(54) IMAGE FORMING SYSTEM AND IMAGE FORMING APPARATUS

(75) Inventor: Kazumi Tabuchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 1074 days.

(21) Appl. No.: 12/073,978

(22) Filed: Mar. 12, 2008

(65) Prior Publication Data

US 2008/0240833 A1 Oct. 2, 2008

(30) Foreign Application Priority Data

Mar. 30, 2007 (JP) ................. 2007-093629
Mar. 30, 2007 (JP) ................. 2007-093630

(51) Int. Cl.
*G06Q 30/00* (2006.01)
(52) U.S. Cl. ............. 705/14; 705/14.35; 705/14.43
(58) Field of Classification Search ........... 705/14.1, 705/14.35, 14.4, 14.43
See application file for complete search history.

(56) References Cited

U.S. PATENT DOCUMENTS

| | | | |
|---|---|---|---|
| 6,873,424 B2* | 3/2005 | Jakobsson et al. | 358/1.13 |
| 2002/0126304 A1* | 9/2002 | Jakobsson et al. | 358/1.12 |
| 2005/0102177 A1* | 5/2005 | Takayama | 705/14 |
| 2005/0137941 A1* | 6/2005 | Fujinawa | 705/26 |
| 2006/0190326 A1* | 8/2006 | Suyama et al. | 705/14 |

FOREIGN PATENT DOCUMENTS

| | | |
|---|---|---|
| JP | 2000-326581 | 11/2000 |
| JP | 2001-077953 | 3/2001 |
| JP | 2001-238071 | 8/2001 |
| JP | 2001-290601 | 10/2001 |
| JP | 2004-038754 | 2/2004 |

* cited by examiner

*Primary Examiner* — Lindsay M. Maguire
(74) *Attorney, Agent, or Firm* — Edwards Wildman Palmer LLP; David J. Silvia

(57) ABSTRACT

An image forming system includes a sheet accommodating section, an image forming section, a term management section, a detecting section, and a display section. The sheet accommodating section has a plurality of sheet trays each accommodating therein printing sheets with advertisement. The term management section has stored therein information on a term of validity of the advertisement as advertisement term information connected with a sheet tray. The detecting section detects whether or not the advertisement is currently valid, based on the advertisement term information. Also, the detecting section determines during printing whether or not the term of validity of the advertisement on the printing sheets accommodated in a sheet tray being used in printing has expired. The display section displays information that a sheet tray other than the sheet tray being used is present which accommodates therein printing sheets each carrying an advertisement which is currently valid, if any.

4 Claims, 18 Drawing Sheets

FIG.6A

THE ADVERTISEMENT
CARRIED BY THE PRINTING SHEETS
IS NO LONGER VALID

CHECK

FIG.6B

THE ADVERTISEMENT CARRIED BY PRINTING SHEETS
SET ON THE TRAY TO BE USED FOR PRINTING
IS NO LONGER VALID. PRINTING IS IMPOSSIBLE.

CHECK

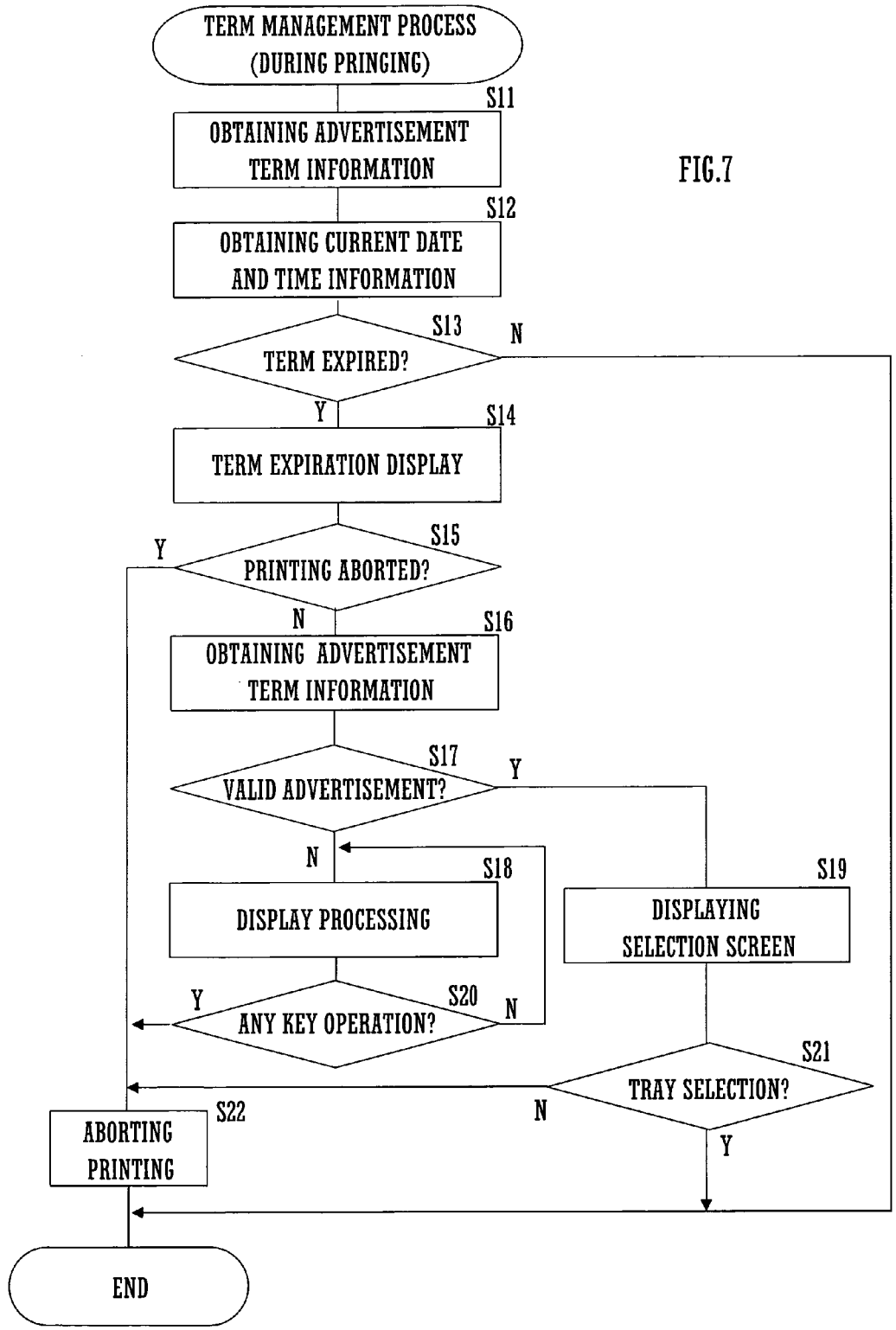

FIG.8

THE TERM OF THE ADVERTISEMENT ON THE PRINTING SHEETS USED HAS EXPIRED DURING PRINTING.
IF ANY OTHER TRAY ACCOMMODATES PRINTING SHEETS
WITH A VALID ADVERTISEMENT, DO YOU WISH TO CONTINUE PRINTING?

| CONTINUE | CANCEL |

FIG.9

STATUSES OF TRAYS ARE AS FOLLOWS.
YOU CAN CONTINUE PRINTING
USING A TRAY WITH A REMARK: (PRINTING POSSIBLE)

TRAY 1: CURRENTLY VALID (PRINTING POSSIBLE)   | CONTINUE |
TRAY 2: NO LONGER VALID (PRINTING IMPOSSIBLE) | CONTINUE |
TRAY 3: CURRENTLY VALID (PRINTING POSSIBLE)   | CONTINUE |

| CANCEL |

FIG.10

TOTAL CHARGE FOR PRINTED SHEETS IS AS FOLLOWS

PRINTING SHEETS WITH A VALID ADVERTISEMENT (25 SHEETS): ¥50
PRINTING SHEETS WITH AN INVALID ADVERTISEMENT (25 SHEETS): ¥25
PRINTING SHEETS WITH NO ADVERTISEMENT (25 SHEETS): ¥250

CHECK

FIG.11

THE TERM OF THE ADVERTISEMENT CARRIED BY THE PRINTING SHEETS
WILL EXPIRE AFTER ABOUT AN HOUR.
IT IS NECESSARY TO RESET THE TERM OF THE ADVERTISEMENT OR REPLACE
THE PRINTING SHEETS WITH OTHER PRINTING SHEETS.
WHEN THE TERM OF AN ADVERTISEMENT EXPIRES,
THE CURRENT CHARGE OF ¥2 FOR PRINTING PER SHEET IS CHANGED TO ¥1.

CHECK

FIG.18

THE TERM OF THE ADVERTISEMENT CARRIED BY PRINTING SHEETS USED
HAS EXPIRED DURING PRINTING.
DO YOU WISH TO CONTINUE PRINTING?
IF YOU CONTINUE PRINTING,
THE CHARGE FOR PRINTING WILL BE DISCOUNTED.

| CONTINUE | CANCEL |

IMAGE FORMING SYSTEM AND IMAGE FORMING APPARATUS

CROSS REFERENCE

This Nonprovisional application claims priority under 35 U.S.C. §119(a) on Patent Application No. 2007-093630 filed in Japan on Mar. 30, 2007, and Patent Application No. 2007-093629 filed in Japan on Mar. 30, 2007 the entire contents of which are hereby incorporated by references.

BACKGROUND OF THE INVENTION

The present invention relates to image forming systems for printing images on printing sheets. More particularly, the present invention relates to an image forming system and apparatus having at least one printing sheet tray accommodating therein printing sheets with advertisement each carrying an advertisement previously printed thereon.

Description of the Related Art

In recent years, it has been possible to utilize a copier everywhere. For example, a shop installed with a copier has appeared in a station yard. Many of supermarkets and convenience stores have been installed with copiers. Therefore, the number of users utilizing copiers that are available to the public is increasing.

In such circumstances, an idea of an printing system was born such that printing sheets with advertisement are accommodated in a part of printing sheet trays of a copier and a charge for printing is discounted when printing is made with such a tray selected. With this idea, the provider of a copier that is available to the public can discount a printing charge to the user because the provider can collect an advertisement running fee from the advertiser.

Usually, the advertisement carried by such a printing sheet has the term of validity. In cases where printing sheets with advertisement each carrying an advertisement which is no longer valid are distributed, the advertiser often cannot realize sales promotion. Also, such an advertisement which is not longer valid is information of no value for the user. Therefore, when the term of validity of an advertisement carried by printing sheets accommodated in a printing sheet tray has expired, it is preferable to withdraw such printing sheets from the tray immediately.

As the number of copiers using printing sheets with advertisement increases, it becomes difficult for the advertiser to withdraw printing sheets carrying an advertisement which is no longer valid.

An object of the present invention is to provide an image forming system and apparatus which is capable of preventing an advertiser and a user from incurring a disadvantage even when the withdrawal of printing sheets carrying an advertisement which is longer valid is delayed.

SUMMARY OF THE INVENTION

An image forming system according to a first aspect of the present invention prints an image on a printing sheet. The image forming system includes a sheet accommodating section, an image forming section, a term management section, a detecting section, and a display section. The sheet accommodating section has a plurality of sheet trays each accommodating therein printing sheets with advertisement each carrying an advertisement previously printed thereon. The image forming section prints an image on a printing sheet fed from the sheet accommodating section. The term management section has stored therein information on a term of validity of the advertisement carried by a printing sheet with advertisement as advertisement term information connected with a sheet tray accommodating therein the printing sheet with advertisement. The detecting section detects whether or not the advertisement carried by each of the printing sheets with advertisement accommodated in each of the sheet trays is currently valid, based on the advertisement term information stored in the term management section. Also, the detecting section determines during printing whether or not the term of validity of the advertisement carried by each of the printing sheets with advertisement accommodated in a sheet tray being used in printing has expired. The display section suspends printing when it is determined that the term of validity of the advertisement carried by each of the printing sheets with advertisement accommodated in the sheet tray being used in printing has expired, and displays information that a sheet tray other than the sheet tray being used is present which accommodates therein printing sheets each carrying an advertisement which is currently valid, if any.

An image forming system according to a second aspect of the present invention prints an image on a printing sheet. The image forming system includes a sheet accommodating section, an image forming section, a term management section, a detecting section, and a sheet disposal section.

The sheet accommodating section has at least one sheet tray accommodating therein printing sheets with advertisement each carrying an advertisement previously printed thereon. The image forming section prints an image on a printing sheet fed from the sheet accommodating section. The term management section has stored therein information on a term of validity of the advertisement carried by a printing sheet with advertisement as advertisement term information connected with a sheet tray accommodating the printing sheet with advertisement. The detecting section detects a sheet tray accommodating therein printing sheets with advertisement each carrying an advertisement which is no longer valid, based on the advertisement term information stored in the term management section.

The sheet disposal section causes the printing sheets with advertisement each carrying the advertisement which is no longer valid to escape from the sheet tray during standby for printing, based on a result of detection by the detecting section. An example of such a sheet disposal section is configured to shunt a printing sheet being fed from a sheet feed path and guide the printing sheet to a withdrawal area. The image forming system preferably includes a notification section for notifying an advertiser of information that the printing sheets have been caused to escape from the sheet tray by the sheet disposal section when the escape has occurred.

Thus, printing sheets each carrying an advertisement which is no longer valid are caused to escape from the sheet tray automatically by the sheet disposal section. For this reason, the possibility that printing sheets each carrying an advertisement which is no longer valid are subjected to the printing process is lowered.

The foregoing and other features and attendant advantages of the present invention will become more apparent from the reading of the following detailed description of the invention in conjunction with the accompanying drawings.

BRIEF DESCRIPTION OF THE DRAWINGS

FIGS. 6A and 6B are each an illustration showing an exemplary display screen image;

FIG. 7 is a flowchart showing an operating procedure by which a CPU performs a term management process;

FIG. 8 is an illustration showing an exemplary display screen image;

FIG. 9 is an illustration showing an exemplary display screen image;

FIG. 10 is an illustration showing an exemplary display screen image;

FIG. 11 is an illustration showing an exemplary display screen image;

FIG. 18 is an illustration showing an exemplary display screen image.

DETAILED DESCRIPTION OF THE INVENTION

The present invention will now be described in detail with reference to the drawings.

Figure 1:
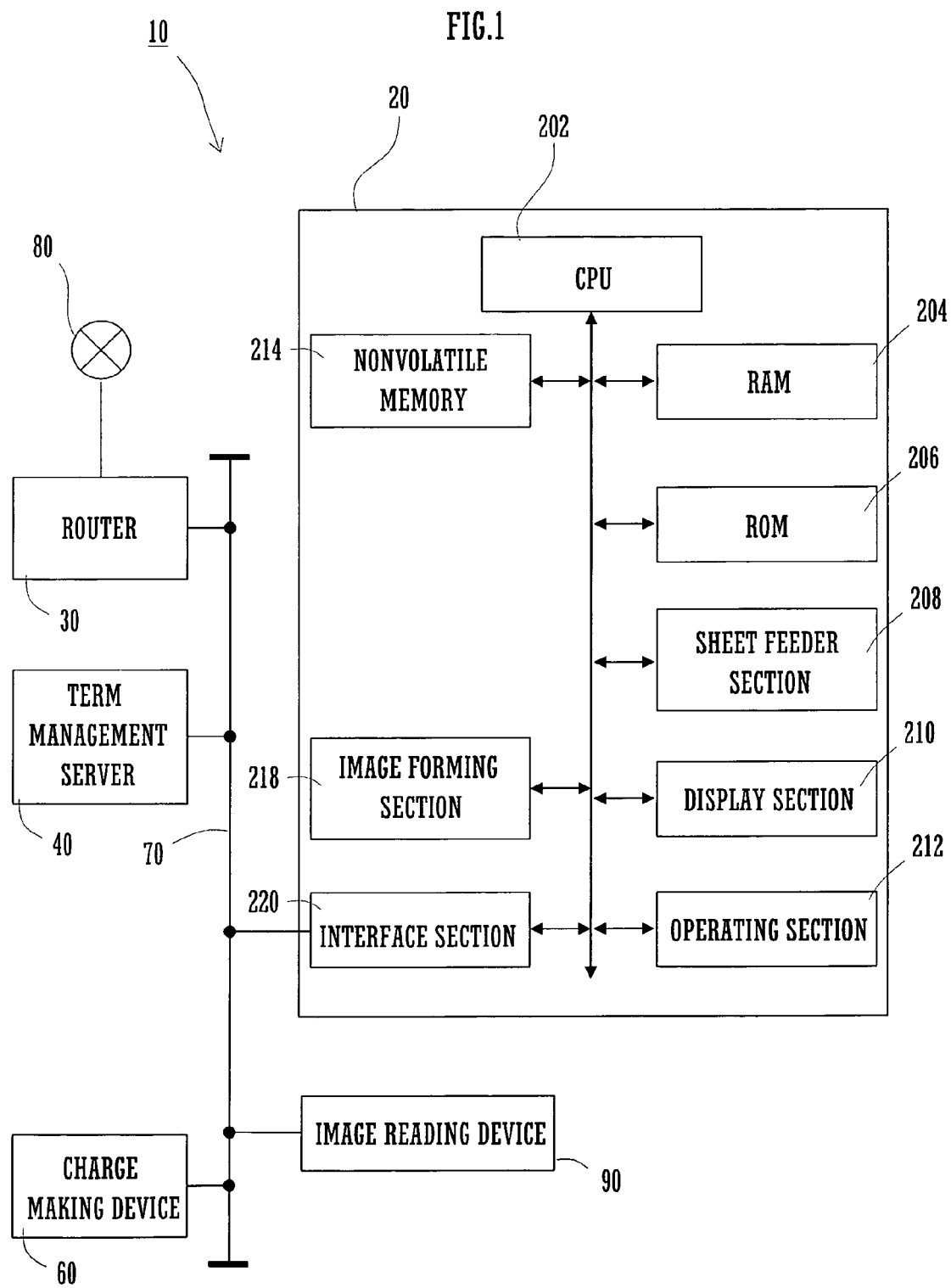
FIG. 1 is a diagram schematically illustrating the configuration of an image forming system according to a first embodiment of the present invention.

Referring to FIG. 1, description will be made of an image forming system 10 according to a first embodiment of the present invention. The image forming system 10 includes an image forming apparatus 20. The image forming apparatus 20 is installed at a place to which the public is accessible, for example, a convenience store. The image forming apparatus 20 is configured to be capable of printing an image on a printing sheet with advertisement which carries an advertisement previously printed thereon.

Figure 2:
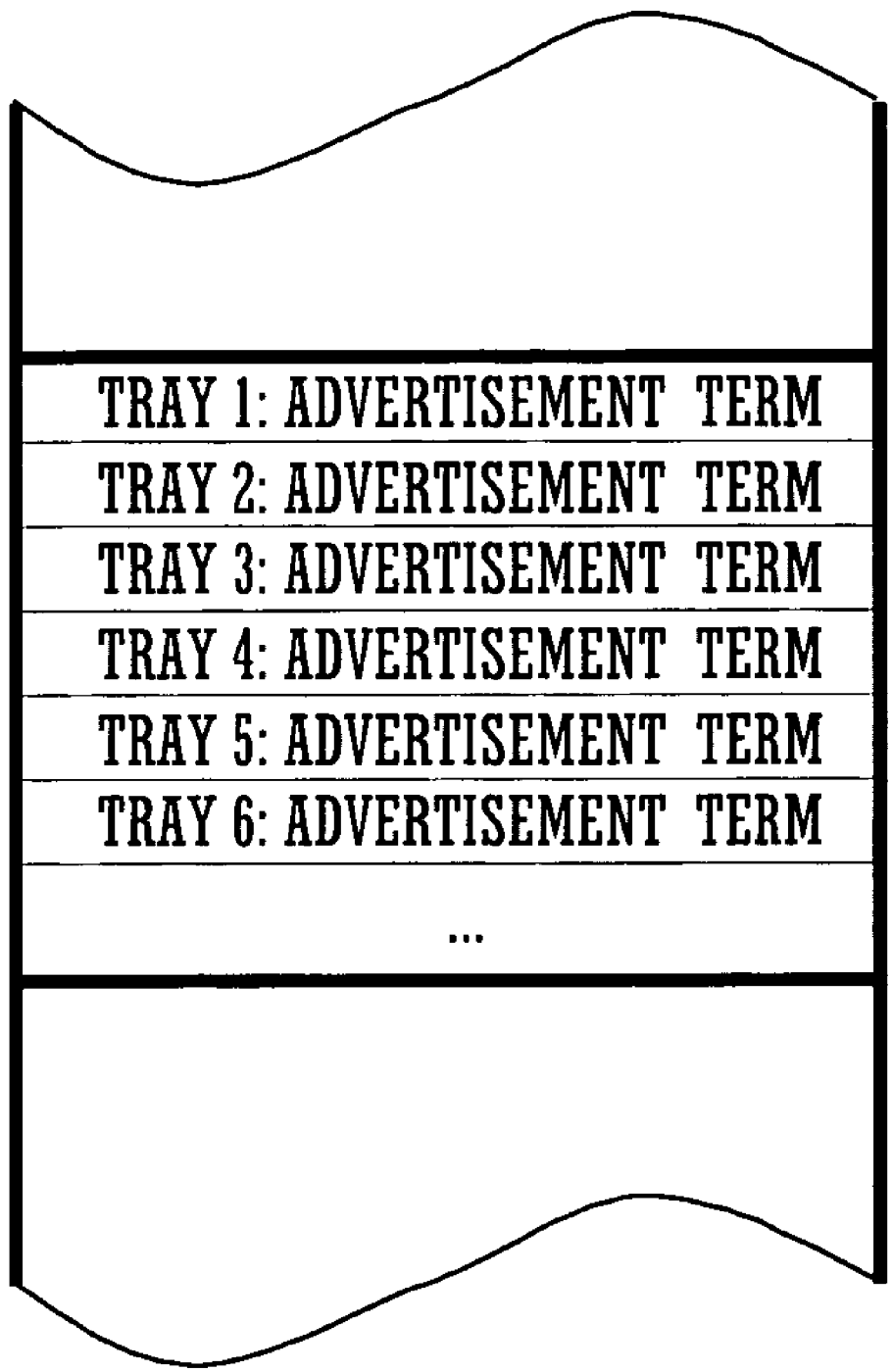
FIG. 2 is an illustration showing exemplary items of information stored in a term management server.
Figure 3A:
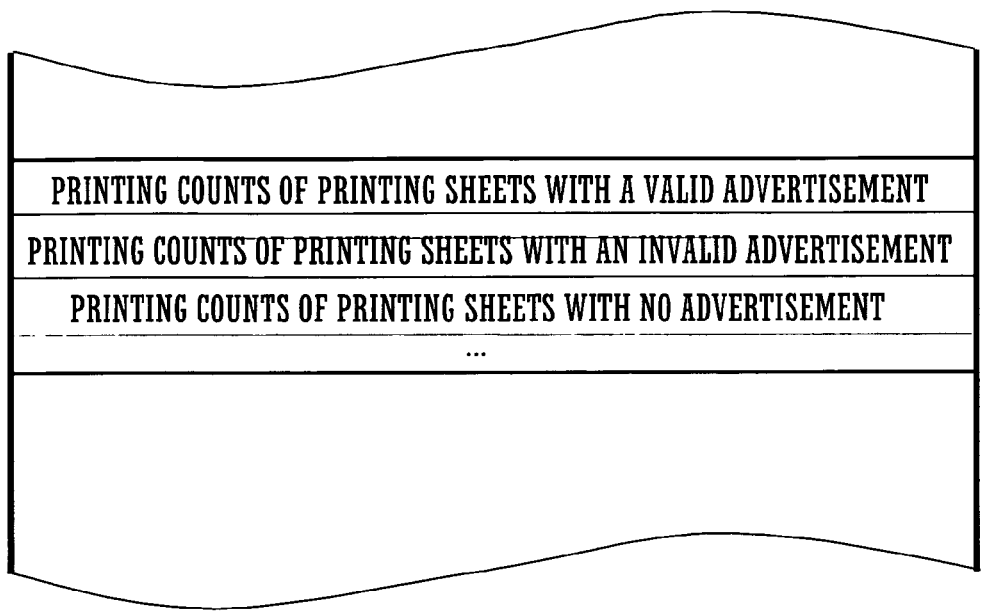
FIGS. 3A and 3B are each an illustration showing exemplary items of information stored in a charge making device.
Figure 3B:
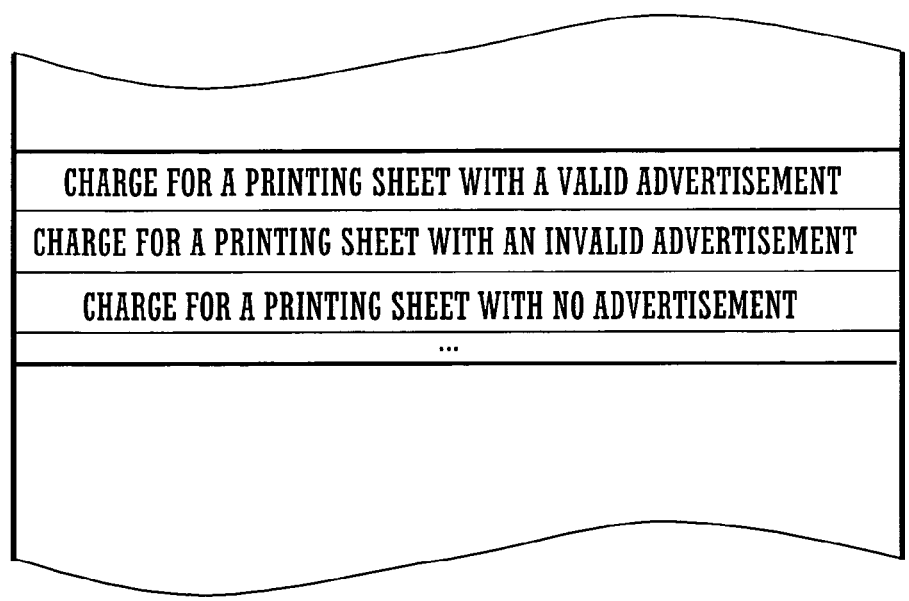

The image forming apparatus 20 is connected to each of a router 30, term management server 40, charge making device 60 and image reading device 90 via a network 70. The router 30 is connected to Internet 80. The term management server 40 manages the terms of validity of advertisements carried by printing sheets with advertisement accommodated in the image forming apparatus 20. FIG. 2 illustrates exemplary items of information stored in the term management server 40. As shown in FIG. 2, the term management server 40 has stored therein information on the term of validity of an advertisement carried by a printing sheet with advertisement as advertisement term information connected with a sheet tray which accommodates this printing sheet therein. The term management server 40 is configured to allow access thereto via Internet 80, hence, permit information on the term of validity of the advertisement carried by the printing sheet to be browsed from outside. The charge making device 60 performs a charging making process for making a charge for use of the image forming apparatus. The charge making device 60 has stored therein information on different piece rates of charge established in accordance with the types of printing sheets, i.e., printing sheet of a type carrying no advertisement, printing sheet of a type carrying an advertisement which is valid, and printing sheet of a type carrying an advertisement which is no longer valid. FIGS. 3A and 3B are each an illustration showing exemplary items of information stored in the charge making device 60. The image reading device 90 creates image data by reading an image of a document.

The image forming apparatus 20 includes an interface section 220, operating section 212, image forming section 218, display section 210, sheet feeder section 208, ROM 206, RAM 204, nonvolatile memory 214, and CPU 202.

The interface section 220 has the function of taking charge of communications with the network 70. The operating section 212 includes plural keys for receiving input operations by the user. The image forming section 218 performs an electrophotographic image forming process on a printing sheet in accordance with image data inputted. The display section 210 is configured to display information that should be notified to the user. The sheet feeder section 208 is configured to feed printing sheets to the image forming section 218. The ROM 206 has stored therein plural programs that are necessary for the CPU 202 to operate. The RAM 204 is nonvolatile memory for temporarily storing image data and the like therein. The nonvolatile memory 214 is configured to store therein advertisement term information obtained from the term management server 40. The CPU 202 is configured to control operations of the image forming apparatus 20 systematically based on the programs stored in the ROM 206.

Figure 4:
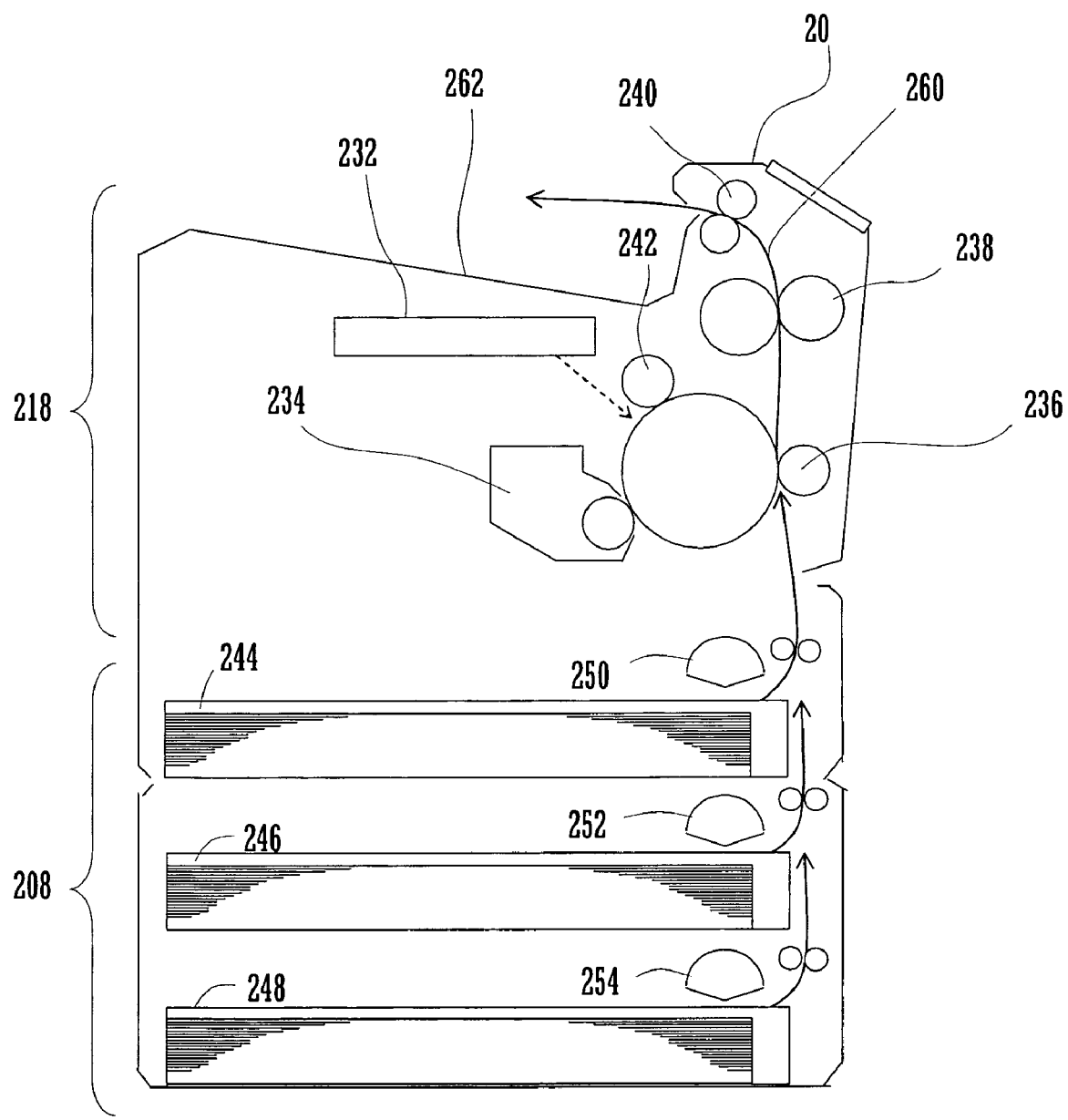
FIG. 4 is a view showing the structure of an image forming apparatus.

Referring to FIG. 4, further description will be made of the structure of the image forming apparatus 20. As shown, the image forming apparatus 20 has a sheet feed path 260 formed internally thereof. A photosensitive drum 230 is disposed so as to be in contact with the sheet feed path 260. Around the photosensitive drum 230 there are disposed an electrostatic charger unit 242, exposure unit 232, developing unit 234, and transfer unit 236. A fixing unit 238 and an ejection roller 240 are disposed on the sheet feed path 260 at respective locations downstream of the photosensitive drum 230.

The electrostatic charger unit 242 electrostatically charges the periphery of the photosensitive drum 4 uniformly. The exposure unit 232 forms an electrostatic latent image on the periphery of the photosensitive drum 230. The developing unit 234 develops the electrostatic latent image formed on the periphery of the photosensitive drum 230 by means of toner. The transfer unit 8 transfers the resulting toner image formed on the periphery of the photosensitive drum 230 to a surface of a printing sheet. The fixing unit 238 fixes the toner image adhering to the printing sheet by heat and pressure. The ejection roller 240 ejects the printing sheet onto an ejected sheet tray 262.

As shown in FIG. 4, the sheet feeder section 208 includes three sheet feed trays 244, 246 and 248. Printing sheets with advertisement each carrying an advertisement previously printed thereon are set on at least one of the sheet feed trays 244, 246 and 248. Pickup rollers 250, 252 and 254 are each disposed adjacent a respective one of the sheet feed trays 244, 246 and 248.

Figure 5:
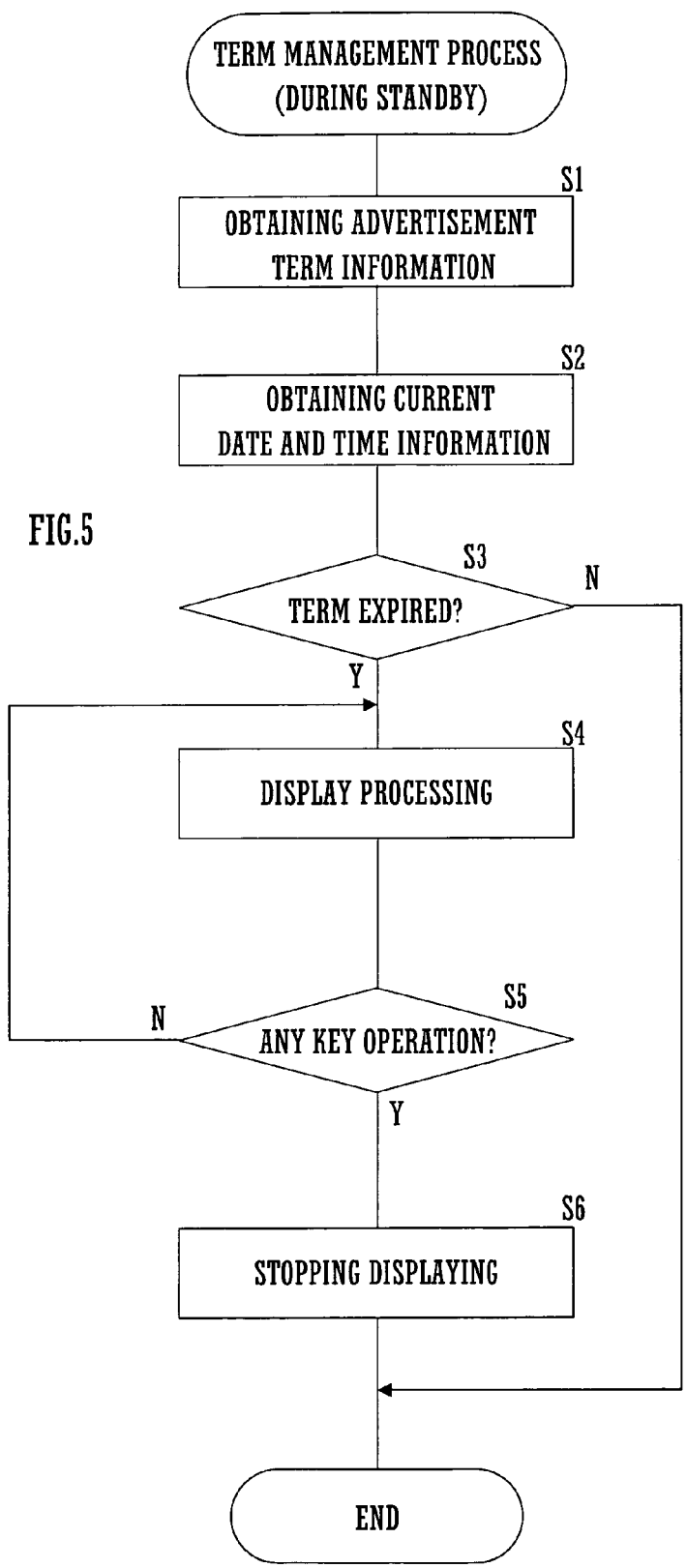
FIG. 5 is a flowchart showing an operating procedure by which a CPU performs a term management process.

Referring to FIG. 5, description will be made of an operating procedure by which the CPU 202 performs a term management process during standby for printing. During standby for printing, the CPU 202 obtains advertisement term information from the term management server 40 with appropriate timing (step S1). Subsequently, the CPU 202 obtains current date and time information (step S2). Subsequently, the CPU 202 compares the advertisement term information with the current date and time information to determine whether or not printing sheets with advertisement each carrying an advertisement which is no longer valid are accommodated in any one of the sheet feed trays 244, 246 and 248 (step S3).

If it is determined in the step S3 that any one of the sheet feed trays which accommodates therein printing sheets carrying such an advertisement which is no longer valid is present, a display is made of information that the advertisement carried by the printing sheets accommodated in that sheet feed tray is no longer valid (step S4). Examples of display screen images provided by the step S4 include those shown in FIGS. 6A and 6B. In cases where the display process is performed during standby, a display as shown in FIG. 6A is made which informs that the advertisement is no longer valid. In cases where the display process is performed just before printing, a display as shown in FIG. 6B is made.

The CPU 202 causes the display made in the step S4 to continue until a next key operation (step 5S). When a key operation by the user is detected in the step 5, the CPU 202 stops displaying the display screen image provided in the step S4 (step S6).

Referring to FIG. 7, description will be made of an operating procedure by which the CPU 202 performs a term management process during printing. Even during printing, the CPU 202 obtains advertisement term information from the term management server 40 with appropriate timing (step S11). Subsequently, the CPU 202 obtains current date and time information (step S12). Subsequently, the CPU 202 compares the advertisement term information with the current date and time information to determine whether or not printing sheets each carrying an advertisement that is no longer valid are accommodated in the sheet feed tray being used for printing (step S13).

If it is determined in the step S13 that the sheet feed tray being used accommodates therein printing sheets each carrying such an advertisement that is no longer valid, a term expiration display as shown in FIG. 8 is made (step S14). The user is then prompted to select an option to abort printing or an option to continue printing the printing sheets each carrying the advertisement that is no longer valid (step S15).

If the user selects the option to abort printing, the CPU 202 aborts printing (step S22).

Alternatively, if the user selects the option to continue printing, the CPU 202 obtains advertisement term information from the term management server 40 again (step S16) and then determines whether or not another tray which accommodates therein printing sheets each carrying an advertisement which is currently valid is present (step S17). If it is determined in the step S17 that another sheet feed tray which accommodates therein printing sheets each carrying such an advertisement which is currently valid is present, the CPU 202 causes the display section 210 to display a selection screen shown in FIG. 9 and waits for user's selection of a tray (step S21). If the user makes tray selection in the step S21, printing is resumed using the tray thus selected. Alternatively, if the user does not make tray selection in the step S21, printing is aborted (step S22).

If it is determined in the step S17 that there is no tray accommodating printing sheets each carrying an advertisement which is currently valid, the CPU 202 causes the display section 210 to display a display screen image shown in FIG. 6B. The CPU 202 causes the display made in the step S18 to continue until a next key operation (step S20). When a key operation by the user is detected in the step S20, the CPU 202 stops displaying the display screen image provided in the step S18.

The image forming apparatus 20 is configured to display the items of the charge as shown in FIG. 10 every time the printing process is completed.

Even when the term of validity of an advertisement carried by a printing sheet has expired during printing, the embodiment thus described makes it possible to perform printing using another printing sheet carrying an advertisement which is currently valid. For this reason, the possibility that printing is made on a printing sheet carrying an advertisement which is no longer valid, is lowered and, hence, the advertiser and the user can be prevented from incurring disadvantages.

The image forming apparatus may be configured to change the piece rate of charge for printing to an appropriate rate worthy of a printing sheet carrying an advertisement which is no longer valid when the term of validity of an advertisement carried by a printing sheet has expired during printing. By so doing, any disadvantage is not likely to the user receiving a printing sheet carrying such an advertisement which is no longer valid.

The image forming apparatus may be configured to cause the display section 210 to display a display screen image as shown in FIG. 11 beforehand when the deadline of validity of an advertisement carried by a printing sheet becomes close at hand during printing.

Figure 12:
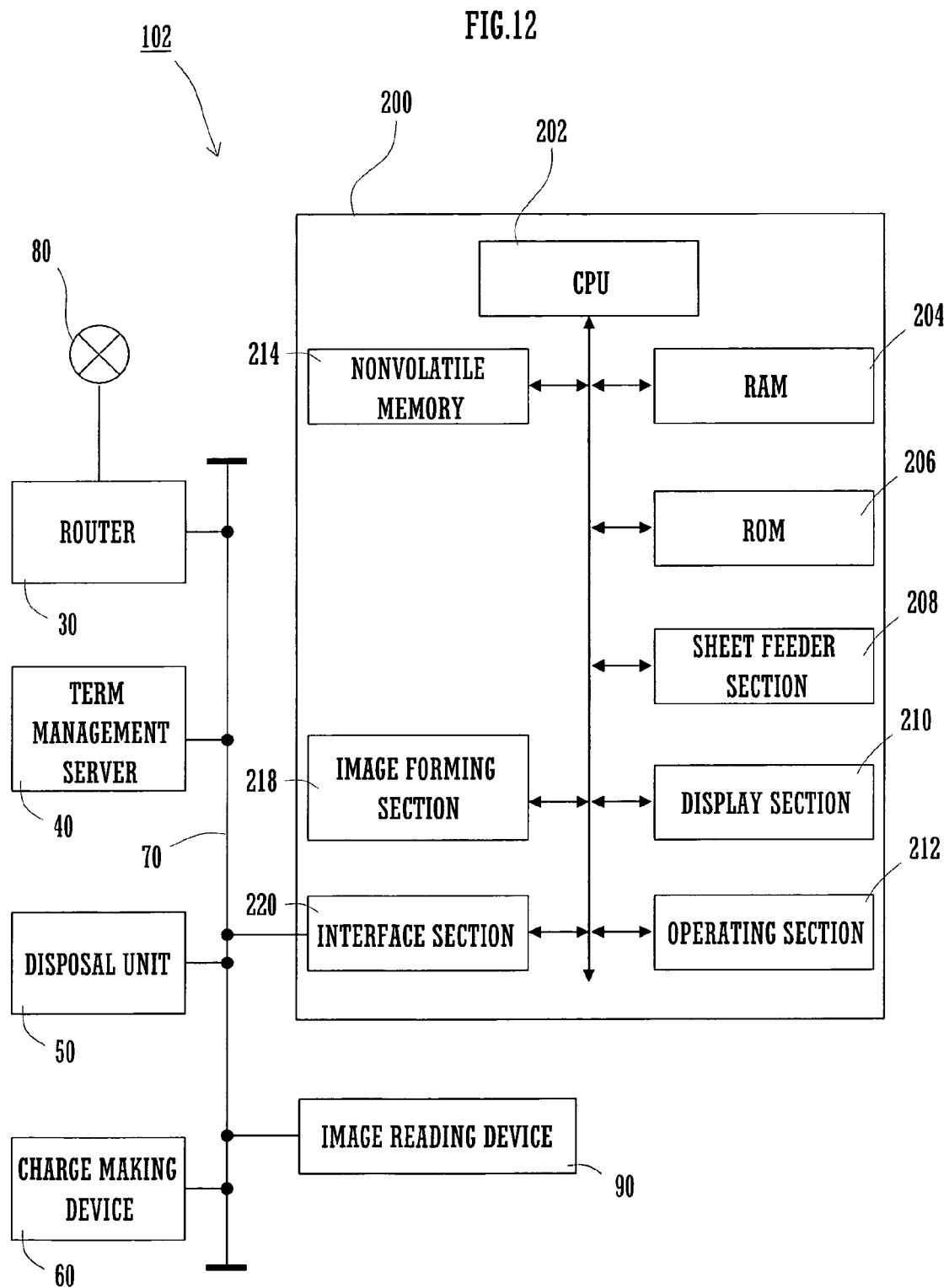
FIG. 12 is a diagram schematically illustrating the configuration of an image forming system according to a second embodiment of the present invention.

Referring to FIG. 12, description will be made of an image forming system 102 according to a second embodiment of the present invention. The image forming system 102 according to the second embodiment is basically similar in configuration to the image forming system 10 according to the first embodiment. The image forming system 102 differs from the image forming system 10 in that the system 102 further includes a disposal unit 50. The disposal unit 50 is configured to receive printing sheets to be disposed of from image forming apparatus 200.

Figure 13:
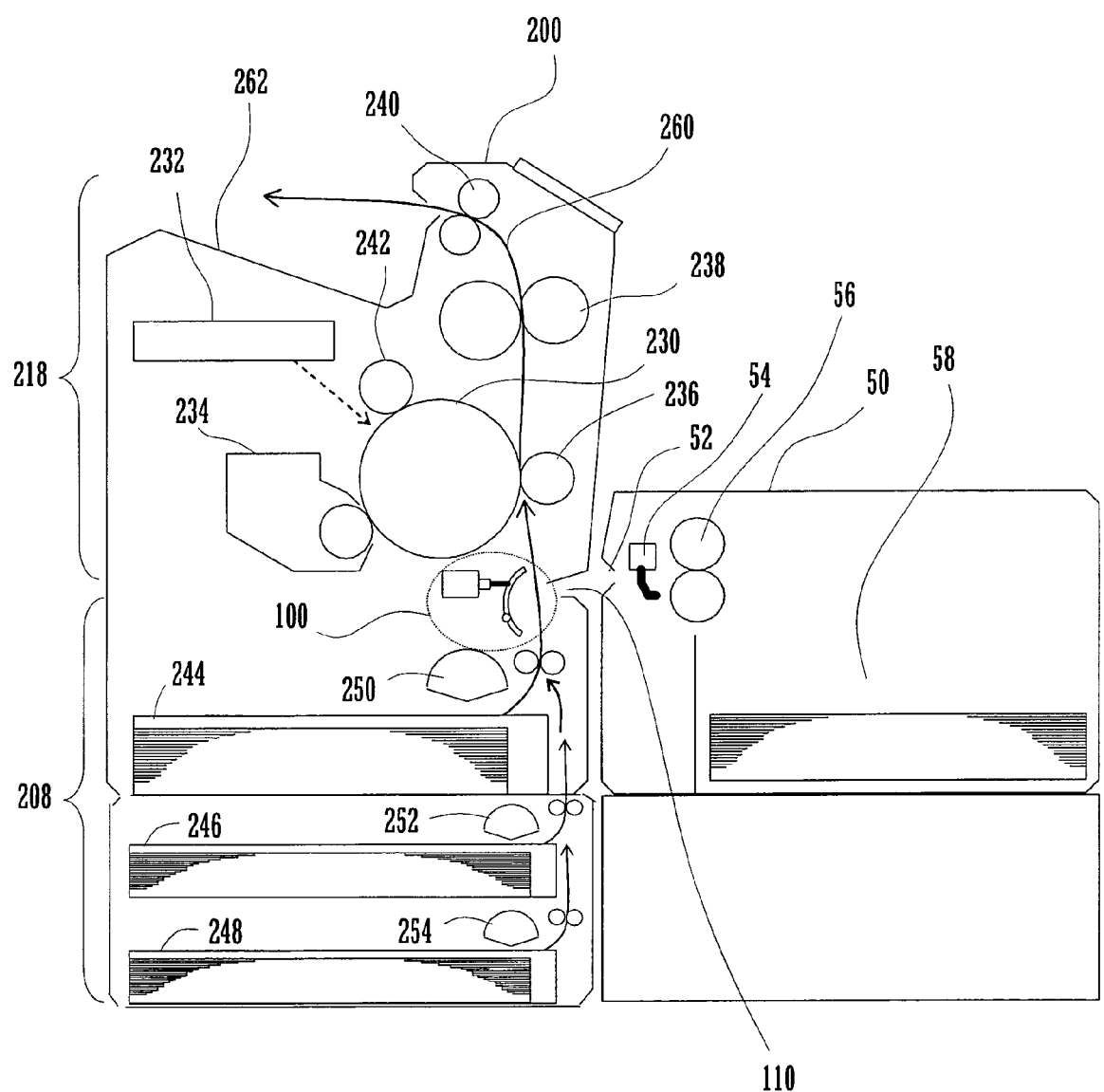
FIG. 13 is a view showing the structure of an image forming apparatus.

Referring to FIG. 13, further description will be made of the structure of the image forming apparatus 200. The structure of the image forming apparatus 200 is basically the same as that of the image forming apparatus 20. The image forming apparatus 200 includes a sheet shunting mechanism 100 in addition to the components of the image forming apparatus 20. The sheet shunting mechanism 100 is located in the sheet feeder section 208. The sheet shunting mechanism 100 selectively guides a printing sheet being fed on the sheet feed path 260, toward a shunting outlet 110.

Figure 14A:
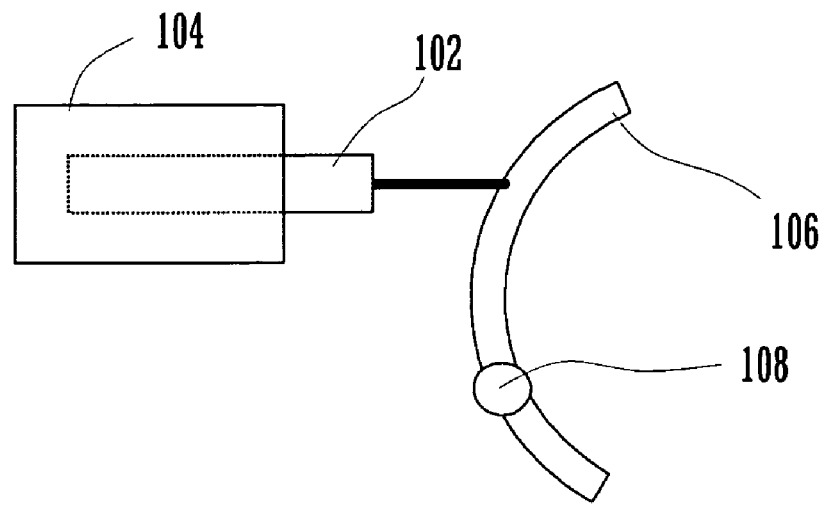
FIGS. 14A and 14B are views illustrating an operation of a sheet shunting mechanism.
Figure 14B:
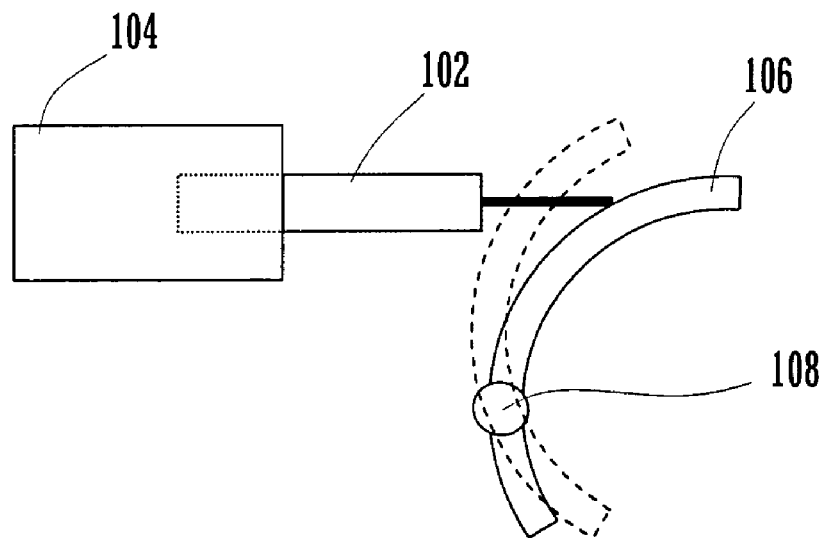

Referring to FIGS. 14A and 14B, description will be made of operation of the sheet shunting mechanism 100. The sheet shunting mechanism 100 includes a base portion 104, actuator 102, and guide member 106. The base portion 104 is fixed at an appropriate location in the image forming apparatus 200. The base portion 104 supports the actuator 102 for reciprocation. The guide member 106 is pivotally supported by a support shaft 108. The guide member 106 is biased counterclockwise in FIG. 14A by means of a non-illustrated biasing member. As shown in FIGS. 14A and 14B, by moving the actuator 102 toward the guide member 106, the guide member 106 is pushed to pivot by the actuator 102. When the actuator 102 retracts toward the base portion 104, the guide member 106 returns to the position shown in FIG. 14A.

During standby for printing, the image forming apparatus 200 obtains advertisement term information stored in the term management server 40 and writes the advertisement term information over existing information stored in the nonvolatile memory 214. The image forming apparatus 200 compares the advertisement term information with the current date and time to detect a sheet tray accommodating printing sheets with advertisement each carrying an advertisement which is no longer valid. Subsequently, the image forming apparatus 200 performs a sheet disposal process for disposing of printing sheets each carrying an advertisement which is no longer valid, as shown in FIG. 15.

Figure 15:
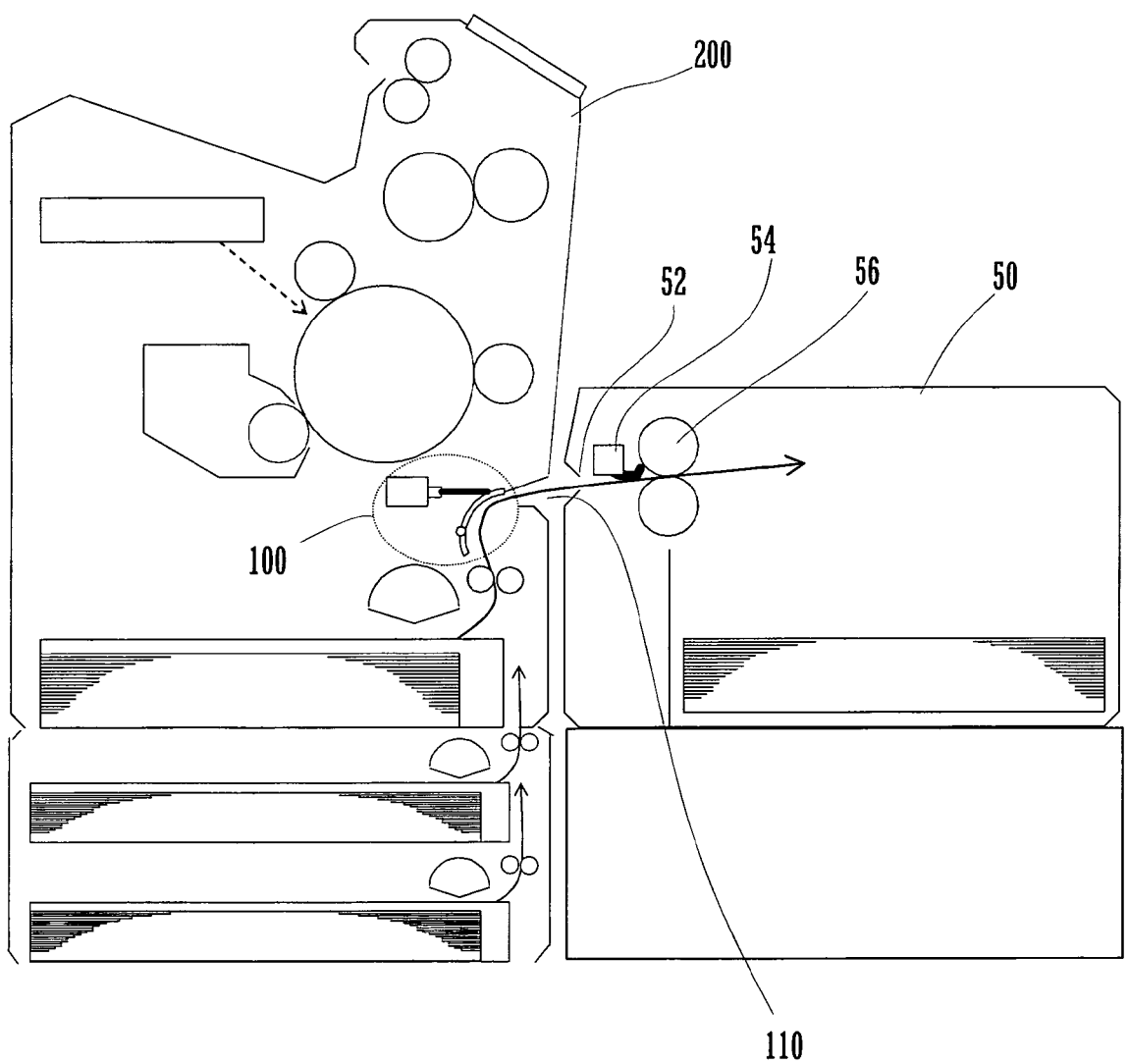
FIG. 15 is a view illustrating the operation of the sheet shunting mechanism.

Referring to FIG. 15, description will be made of the sheet disposal process. The disposal unit 50 includes a sheet inlet 52, sheet sensor 54, and an introduction roller 56. The sheet inlet 52 is configured to receive a printing sheet discharged from the shunting outlet 110. The sheet sensor 54 detects a printing sheet introduced into the sheet inlet 52. The introduction roller 56 is configured to introduce a printing sheet into a sheet collecting section 58 in response to the detection of the printing sheet by the sheet sensor 54. In the sheet disposal process, the CPU 202 controls the sheet feeder section 208 so as to feed all the printing sheets with advertisement accommodated in the sheet feed tray 244, 246 or 248 to the disposal unit 50.

Figure 16:
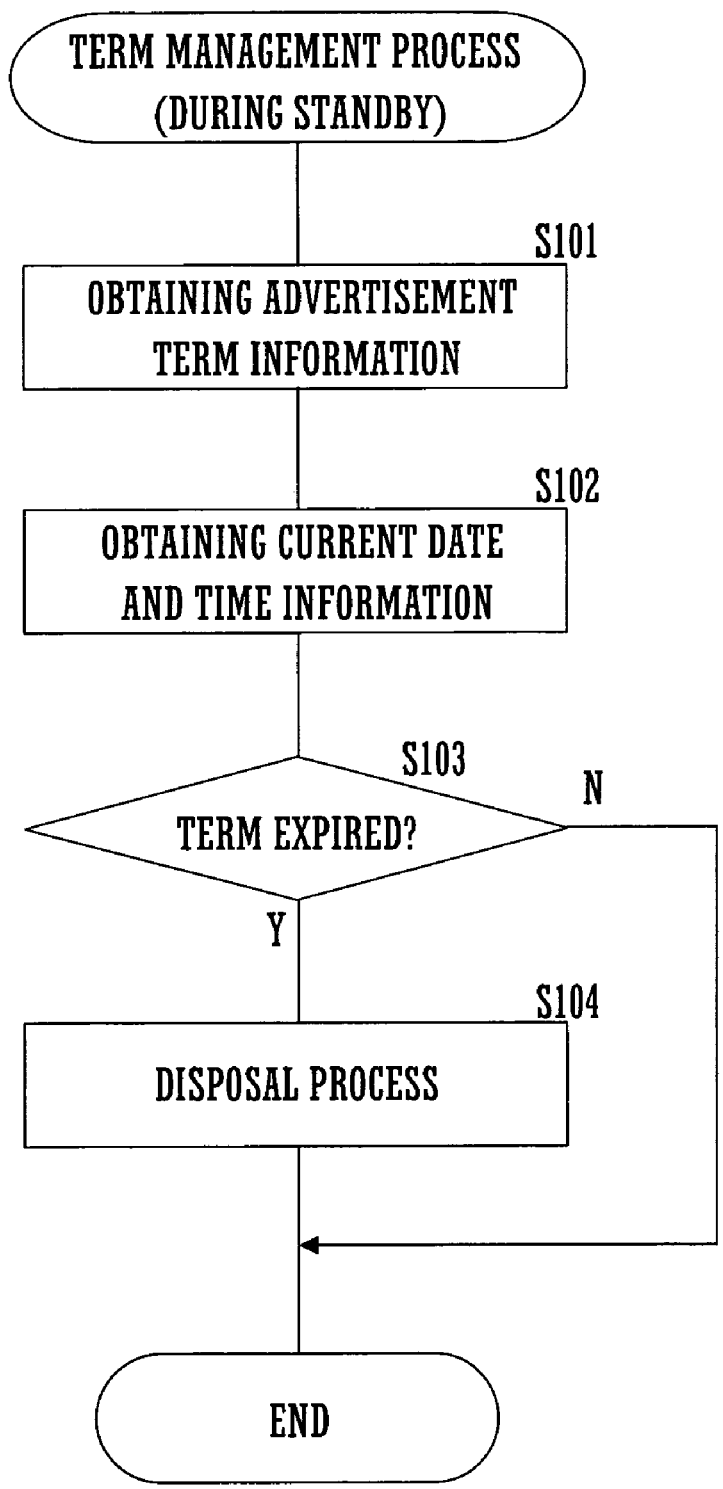
FIG. 16 is a flowchart showing an operating procedure by which a CPU performs a term management process.

Referring to FIG. 16, description will be made of an operating procedure by which the CPU 202 performs a term management process during standby for printing. During standby for printing, the CPU 202 obtains advertisement term information from the term management server 40 with appropriate timing (step S101). Subsequently, the CPU 202 obtains current date and time information (step S102). Subsequently, the CPU 202 compares the advertisement term information with the current date and time information to determine whether or not printing sheets each carrying an advertisement which is no longer valid are accommodated in any one of the sheet feed trays 244, 246 and 248 (step S103).

If it is determined in the step S103 that any one of the sheet trays which accommodates therein printing sheets each carrying such an advertisement which is no longer valid is present, the CPU 202 performs the disposal process on that sheet tray (step S104). In the step S104, the CPU 202 causes the sheet feeder section 208 to feed all the printing sheets with advertisement accommodated in the sheet feed tray 244, 246 or 248 to the disposal unit 50.

In the present embodiment, in cases where the disposal process is performed during standby, a display is made of information that the advertisement is no longer valid, as shown in FIG. 6A. In cases where the disposal process is performed just before printing, a display as shown in FIG. 6B is made.

Figure 17:
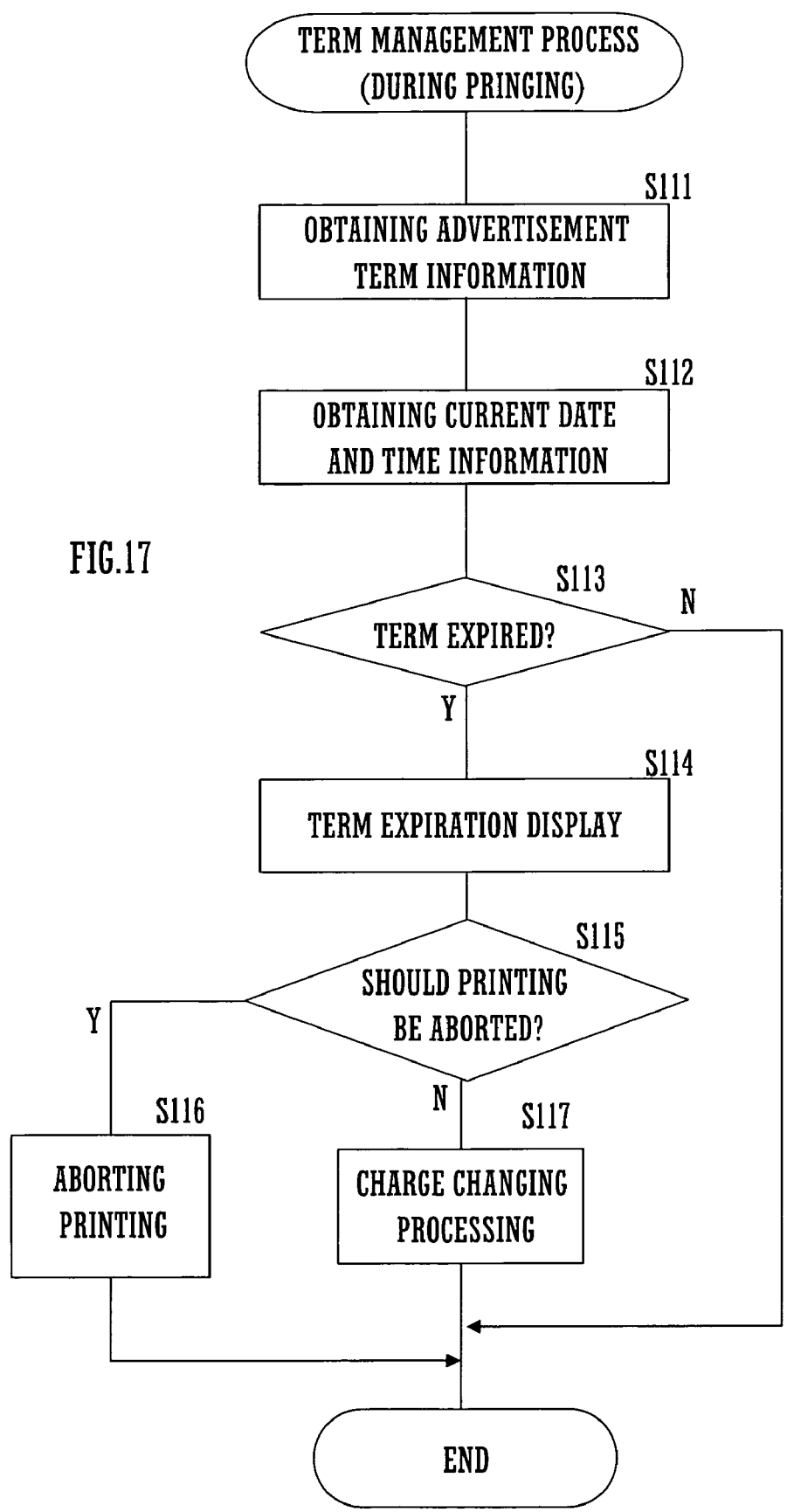
FIG. 17 is a flowchart showing an operating procedure by which a CPU performs a term management process.

Referring to FIG. 17, description will be made of an operating procedure by which the CPU 202 performs a term management process during printing. Even during printing, the CPU 202 obtains advertisement term information from the term management server 40 with appropriate timing (step S111). Subsequently, the CPU 202 obtains current date and time information (step S112). Subsequently, the CPU 202 compares the advertisement term information with the current date and time information to determine whether or not printing sheets each carrying an advertisement which is no longer valid are accommodated in the sheet feed tray being used for printing (step S113).

If it is determined in the step S113 that the sheet feed tray being used accommodates therein printing sheets each carrying such an advertisement which is no longer valid, a term expiration display as shown in FIG. 18 is made (step S114). The user is then prompted to select an option to abort printing or an option to continue printing the printing sheets each carrying the advertisement which is no longer valid (step S115).

If the user selects the option to abort printing in the step S115, the CPU 202 aborts printing (step S116). Alternatively, if the user selects the option to continue printing in the step S115, the CPU 202 changes the piece rate of charge for printing thereafter (S117). In the step S117, the piece rate of charge for printing is changed to a lower rate because of the expiration of the term of validity of the advertisement carried by the printing sheets. This is because such an advertisement which is no longer valid is information of no use.

The image forming apparatus 200 is configured to display the items of the charge as shown in FIG. 10 every time the printing process is completed.

According to the embodiment described above, in cases where withdrawal of printing sheets each carrying an advertisement which is no longer valid is delayed, such printing sheets are automatically disposed of. For this reason, the possibility that printing is made on a printing sheet carrying an advertisement which is no longer valid, is lowered and, hence, the advertiser and the user can be prevented from incurring disadvantages. Further, the present embodiment is configured to change the piece rate of charge for printing to an appropriate rate worthy of a printing sheet carrying an advertisement which is no longer valid even when the term of validity of an advertisement carried by a printing sheet has expired during printing. Therefore, any disadvantage is not likely to the user receiving a printing sheet carrying such an advertisement which is no longer valid.

The image forming apparatus may be configured to cause the display section 210 to display a display screen image as shown in FIG. 11 beforehand when the deadline of validity of an advertisement carried by a printing sheet becomes close at hand during printing.

While any one of the foregoing embodiments has the term management server 40 and the charge making device 60, which are separate from the image forming apparatus 20 or 200, the image forming apparatus may incorporate such term management server and charging making device therein.

The foregoing embodiments are illustrative in all points and should not be construed to limit the present invention. The scope of the present invention is defined not by the foregoing embodiments but by the following claims. Further, the scope of the present invention is intended to include all modifications within the meanings and scopes of claims and equivalents.

What is claimed is:

1. An image forming system for printing an image on a printing sheet, comprising:
   a sheet accommodating section having a plurality of sheet trays each accommodating therein printing sheets with advertisement each carrying an advertisement previously printed thereon;
   an image forming section configured to print an image on a printing sheet fed from the sheet accommodating section;
   a term management server having stored therein information on a term of validity of the advertisement carried by a printing sheet with advertisement as advertisement term information connected with a sheet tray accommodating therein the printing sheet with advertisement; and
   a CPU configured to detect whether or not the advertisement carried by each of the printing sheets with advertisement accommodated in each of the sheet trays is currently valid, based on the advertisement term information stored in the term management server, wherein:
   the CPU determines during printing whether or not the term of validity of the advertisement carried by each of the printing sheets with advertisement accommodated in a sheet tray being used in printing has expired; and the image forming system suspends printing when it is determined that the term of validity of the advertisement carried by each of the printing sheets with advertisement accommodated in the sheet tray being used in printing has expired, the image forming system further comprises a display section configured to display information that a sheet tray other than the sheet tray being used is present which accommodates therein printing sheets with advertisement each carrying an advertisement which is currently valid, if any.

2. The image forming system according to claim 1, wherein the display section indicates all sheet trays each accommodating therein printing sheets with advertisement each carrying an advertisement which is currently valid.

3. The image forming system according to claim 1, wherein: the CPU prompts a user to select an option to continue printing using the sheet tray accommodating therein the printing sheets with advertisement each carrying the advertisement which is currently valid or an option to abort printing when the sheet tray other than the sheet tray being used is present which accommodates therein the printing sheets with advertisement each carrying the advertisement which is currently valid upon suspension of printing due to expiration of the term of validity of the advertisement carried by each of the printing sheets with advertisement accommodated in the sheet tray being used; and the CPU continues printing using the sheet tray selected by the user when the option to continue printing is selected by the user.

4. The image forming system according to claim 1, wherein the image forming system charges for use of the image forming section, and the CPU sets different piece rates of charge in accordance with types of printing sheets including a printing sheet of a type carrying an advertisement which is currently valid, a printing sheet of a type carrying an advertisement which is no longer valid, and a printing sheet of a type carrying no advertisement when the image forming system charges.

* * * * *